United States Patent [19]
Kim et al.

[11] Patent Number: 5,960,029
[45] Date of Patent: Sep. 28, 1999

[54] COHERENT DUAL-CHANNEL QPSK MODULATOR/DEMODULATOR FOR CDMA SYSTEMS, AND MODULATING/ DEMODULATING METHODS THEREFOR

[75] Inventors: Seong-Rag Kim; Hun Lee; Byung-Shik Kang; Jae-Wook Jung, all of Daejeon, Rep. of Korea

[73] Assignee: Electronics and Telecommunications Research Institute, Daejeon, Rep. of Korea

[21] Appl. No.: 08/723,397

[22] Filed: Sep. 30, 1996

[30] Foreign Application Priority Data

Dec. 6, 1995 [KR] Rep. of Korea ............. 95-47060

[51] Int. Cl.$^6$ ............ H04B 15/00; H04K 1/00; H04L 27/30
[52] U.S. Cl. .............. 375/200; 375/205; 375/208; 375/219; 370/209; 370/335; 370/491
[58] Field of Search ............... 370/208–209, 370/335, 514–515, 491, 500; 375/200, 300, 316, 320; 455/63, 65, 133

[56] References Cited

U.S. PATENT DOCUMENTS

| | | | |
|---|---|---|---|
| 5,428,610 | 6/1995 | Davis | 370/491 |
| 5,577,025 | 11/1996 | Skinnner et al. | 370/209 |
| 5,586,122 | 12/1996 | Suzuki et al. | 370/500 |
| 5,623,485 | 4/1997 | Bi | 370/209 |
| 5,668,795 | 9/1997 | Magill et al. | 370/209 |
| 5,668,837 | 9/1997 | Dent | 375/316 |
| 5,712,869 | 1/1998 | Lee et al. | 375/206 |
| 5,717,713 | 2/1998 | Natali | 370/209 |

OTHER PUBLICATIONS

PN–3421 (to be published as IS–95–A) Ballot Version, "TR 45, Mobile Station–Base Station Compatibility Standard for Dual–Mode Wideband Spread Spectrum Cellular System". JTC(IAR)/95.01.10–478R5, Joint Technical Committee (JTC), "Proposed Wideband CDMA PCS Standard".

*Primary Examiner*—Stephen Chin
*Assistant Examiner*—Joseph Roundtree
*Attorney, Agent, or Firm*—Nixon & Vanderhye P.C.

[57] ABSTRACT

A coherent dual-channel QPSK modulator/demodulator for a CDMA system, and modulating/demodulating methods therefor, are disclosed, in which the crosstalk interferences between an I-channel and a Q-channel are eliminated by an orthogonal spreading method, which assigns different Walsh codes to the I-channel and Q-channel. Pseudo-random modulation and pseudo-random demodulation are carried out by using one PN code so as to minimize the channel parameter estimation errors, thereby improving receiving performance.

26 Claims, 5 Drawing Sheets

COHERENT DUAL-CHANNEL QPSK MODULATOR/DEMODULATOR FOR CDMA SYSTEMS, AND MODULATING/ DEMODULATING METHODS THEREFOR

BACKGROUND OF THE INVENTION

1. Field of the Invention

The present invention relates to a coherent dual-channel QPSK (quadrature phase shift keying) modulator/ demodulator for a CDMA (code division multiple access) system, and modulating/demodulating methods therefor, in which, the crosstalk interference between an I-channel and a Q-channel are eliminated by an orthogonal quadrature spreading method, and the channel parameter estimation errors are minimized, thereby improving receiving performance.

2. Description of the Prior Art

In a DSSS (direct sequence spread spectrum) communication system, the QPSK modulating and demodulating methods can be classified into a balanced QPSK and a dual-channel QPSK.

The IS-95 CDMA system proposed by Qualcom employs the balanced QPSK and the wideband CDMA system proposed by OKI employs a variety of the dual-channel QPSK.

In the wideband CDMA system, the same Walsh codes are used both on the I-channel and on the Q-channel of the modulator and the demodulator [$W^I(n)=^Q W(n)$], and therefore, the following crosstalk interferences occur in the demodulator output:

$$y^I_{j,k} = N\alpha_{j,k}(n)\hat{\alpha}_{j,k}(n)\sqrt{(E_{c,j})}$$
$$\{x^I_j(n)\cos(\phi_{j,k}(n) - \hat{\phi}_{j,k}(n)) + x^Q_j(n)\sin(\phi_{j,k}(n) - \hat{\phi}_{j,k}(n))\} + v^I_N(n)$$

$$y^Q_{j,k} = N\alpha_{j,k}(n)\hat{\alpha}_{j,k}(n)\sqrt{(E_{c,j})}$$
$$\{x^Q_j(n)\cos(\phi_{j,k}(n) - \hat{\phi}_{j,k}(n)) + x^I_j(n)\sin(\phi_{j,k}(n) - \hat{\phi}_{j,k}(n))\} + v^Q_N(n)$$

Where N is spreading factor, $\alpha_{j,k}(n)$ is the amplitude of n-th path corresponding to j-th user, $\hat{\alpha}_{j,k}(n)$ is the estimated value of $\alpha_{j,k}(n)$, $\sqrt{(E_{c,j})}$ is the chip energy of j-th user, $X^I_j(n)$ is the input data of I-channel corresponding to j-th user, $\phi_{j,k}(n)$ is the phase of n-th path corresponding to j-th user, and $\hat{\phi}_{j,k}(n)$ is the estimated value of $\phi_{j,k}(n)$, $V^I_N(n)$ is the psudonoise which appeares in I-channel, while $V^Q_N(n)$ is the psudonoise which appeares in Q-channel. And, the term $X^I_j(n)\sin(\phi_{j,k}(n)-\hat{\phi}_{j,k}(n))$ indicates the crosstalk interference which appears in the I-channel, while the term $X^Q_j(n)\sin(\phi_{j,k}(n)-\hat{\phi}_{j,k}(n))$ indicates the crosstalk interference which appears in the Q-channel. In the case of imperfect estimation, the interference increases, thereby deteriorating the performance.

SUMMARY OF THE INVENTION

The present invention is intended to overcome the above described disadvantages of conventional techniques.

The present invention provides a coherent dual-channel QPSK modulator/demodulator for a CDMA system, in which different Walsh codes orthogonally crossing with each other are used to make an I-channel and a Q-channel orthogonally cross so as to eliminate cross talk interference, and so as to minimize errors of the channel parameter estimation, thereby improving receiving performance.

The present invention also can provide coherent dual-channel QPSK modulating/demodulating methods for a CDMA system, in which different Walsh codes orthogonally crossing with each other are used to make an I-channel and a Q-channel orthogonally cross so as to eliminate cross talk interference, and so as to minimize errors of the channel parameter estimation, thereby improving receiving performance.

In achieving the above objects, a coherent dual-channel QPSK modulator for a CDMA system for receiving two input signals through two input terminals to carry out modulation according to the present invention includes a first Walsh spreader, a second Walsh spreader, a first adder, a second adder, a first pseudo-modulator, a second pseudo-modulator, a first pulse shaper, a second pulse shaper, a first amplitude modulator, and a second amplitude modulator. The first Walsh spreader receives first input signals through a first input terminal to carry out a Walsh spreading, and the second Walsh spreader receives second input signals through a second input terminal to carry out a Walsh spreading. The first adder adds a pilot signal to output signals of the first Walsh spreader, and the second adder adds up output signals of the first amplitude modulator and output signals of the second amplitude modulator. The first pseudo-modulator pseudo-modulates an output of the adder ased on certain PN (pseudo-noise), and the second pseudo-modulator pseudo-modulates an output of the second Walsh spreader based on certain PN (pseudo-noise). The first pulse shaper shapes output signals of the first pseudo-modulator into pulse waves to output pulse waves, and the second pulse shaper shapes output signals of the second pseudo-modulator into pulse waves to output pulse waves. The first amplitude modulator amplitude-modulates output signals of the first pulse shaper, and the second amplitude modulator amplitude-modulates output signals of the second pulse shaper.

In another aspect of the present invention, a coherent dual-channel QPSK demodulator for a CDMA system receiving two input signals through an antenna to carry out demodulation according to the present invention includes a first amplitude demodulator, a second amplitude demodulator, a first pulse deshaper, a second pulse deshaper, a first sampler, a second sampler, a pseudo-demodulator, a second pseudo-demodulator, a channel parameter estimator, a first Walsh spreader, a second Walsh spreader, a first accumulator, and a second accumulator. The first amplitude demodulator receives input signals through an antenna to amplitude-demodulate the input signals into demodulated signals, and a second amplitude demodulator receives input signals through an antenna to amplitude-demodulate the input signals into demodulated signals. The first pulse deshaper deshapes the output pulses of the first amplitude demodulator to the original signal form, and the second pulse deshaper deshapes output pulses of the second amplitude demodulator to the original signal form. The first sampler samples output signals of the first pulse deshaper to output them in the form of digital signals, and the second sampler samples output signals of the second pulse deshaper to output them in the form of digital signals. The first pseudo-demodulator pseudo-demodulates output signals of the first sampler based on a pseudo noise, and the second pseudo-demodulator pseudo-demodulates output signals of the second sampler based on a pseudo noise (PN). The channel parameter estimator receives output signals of the first pseudo-demodulator and output signals of the second pseudo-demodulator to estimate channel parameters so as to output first output signals and second output signals. The first Walsh spreader receives first output signals from the channel parameter estimator to carry out a Walsh spreading.

The first accumulator receives output signals of the first Walsh spreader to carry out accumulations for the chip duration, and the second accumulator receives output signals of the second Walsh spreader to carry out accumulations for the chip duration.

In another aspect of the present invention, a coherent dual-channel QPSK modulating method for a CDMA system receiving two input signals through two input terminals to carry out modulation according to the present invention includes six steps. In the first step, first and second input signals are received to Walsh-spread them into different Walsh codes. In the second step, pilot signals are added to the Walsh spread first input signals so as to form first signals. In the third step, the first signals of the second step and the Walsh spread input signals of the first step are pseudo-modulated based on a certain PN, so as to form pseudo-modulated first signals and second signals. In the fourth step, the pseudo-modulated first and second signals of the third step are shaped into pulse waves so as to form first pulse signals and second pulse signals. In the fifth step, the first and second pulse signals of the fourth step are amplitude-modulated into different modulated signals. In the sixth step, the amplitude-modulated first and second signals of the fifth step are added together so as to output them to an antenna.

In another aspect of the present invention a coherent dual-channel QPSK demodulating method for a CDMA system receiving two input signals through two input terminals to carry out demodulation according to the present invention includes seven steps. In the first step, the input signals from an antenna are divided into the first and second input signals so as to amplitude-demodulate them. In the second step, the amplitude-demodulated first and second input pulse waves of the first step are deshaped into original signals so as to form first and second signals. In the third step, the deshaped first and second signals of the second step are sampled into digital signals. In the fourth step, the first and second signals of the third step are pseudo-demodulated based on a certain PN. In the fifth step, the first and second signals of the fourth step are analyzed to estimate the channel parameters so as to form first output signals and second output signals. In the sixth step, the first output signals and the second output signals of the fifth step are Walsh-spread based on the Walsh code. In the seventh step, the Walsh-spread signals of the sixth step are accumulated for a chip period before outputting them.

BRIEF DESCRIPTION OF THE DRAWINGS

The above-mentioned object and advantages of the present invention will become more apparent by describing in detail the preferred embodiment of the present invention with reference to the attached drawings in which.

DETAILED DESCRIPTION OF THE PREFERRED EMBODIMENT

An examplary coherent dual-channel QPSK modulator/demodulator for a CDMA system, and the modulating/demodulating methods therefor according to the present invention will be described referring to the attached drawings.

Figure 1:
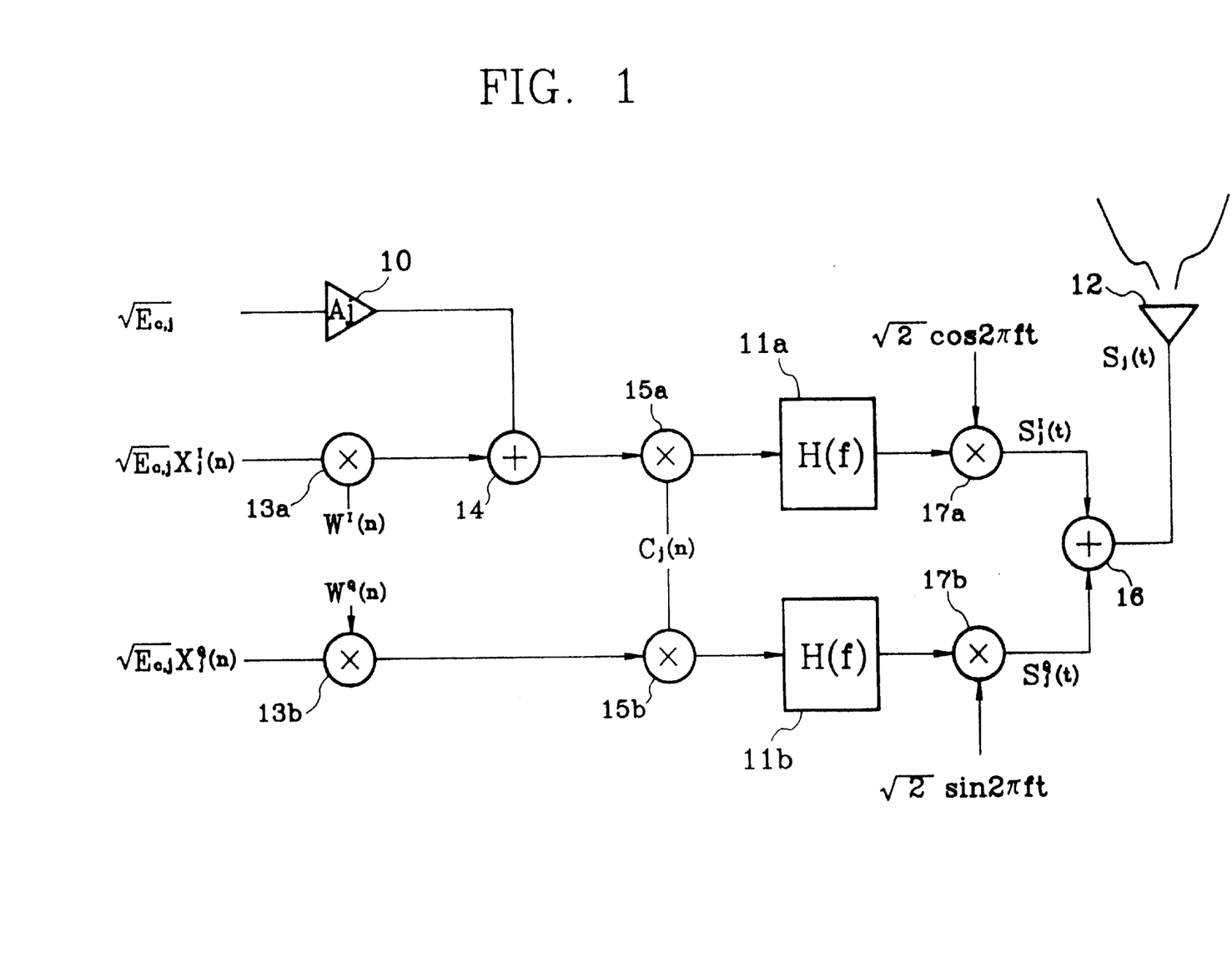
FIG. 1 is a block diagram showing the constitution of the modulator according to the present invention.

FIG. 1 is a block diagram showing the constitution a modulator according to the present invention.

Referring to FIG. 1, the pilot signals are inputted into a pilot channel, I-input data are inputted into an I-channel, and Q input data are inputted into a Q-channel.

The pilot signals are amplified by an amplifier 10, while two orthogonal Walsh codes are multiplied by the I-input signals and the Q-input signals at multipliers 13a, 13b which are the first and the second walsh spreading means so as to be spread.

After the pilot signals which have been amplified by the amplifier 10 are combined with I-input signals having been Walsh-spread and spread through an adder 14 which is the first adding means, it is spread again based on a PN code at multiplier 15a which is the second psudo-random modulating means. Further, the Q-input signals which have been Walsh covered and spread by the multiplier 13b are spread again based on a PN code at the multiplier 15b which PN code at the multiplier 15b which is the second pseudo-modulating means.

The I-signals and Q-signals which have been spread based on the PN code are formed into pulses by shaping filters 11a and 11b which are pulse shaping means. Thereafter, these two signals are amplitude-modulated based on cosine and sine signals respectively by multipliers 17a and 17b which are the first and the second amplitude-modulating means for amplitude-modulation. The respective output signals which have been amplitude-modulated by the multipliers 17a and 17b are added by the second adder 16 so as to be transmitted through an antenna 12.

That is, the signals of the I-channel and the Q-channel are mutually orthogonal through combination of one PN sequence and two Walsh codes based on dual-channel QPSK modulating and demodulating methods.

In the modulating device of FIG. 1, the signals which are transmitted to the j-th user's antenna can be expressed as follows:

$$S_j(t) = \sqrt{2}\sqrt{E_{c,j}}\sum_n \{A_j + W^I(n)x^I{}_j(n)\}C_j(n)h(t - nT_c)\cos(2\pi f_0 t) +$$

$$\sqrt{2}\sqrt{E_{c,j}}\sum_n \{W^Q(n)x^Q{}_j(n)\}C_j(n)h(t - nT_c)\sin(2\pi f_0 t)$$

where $A_j$ is the size of pilot signals, $W^I(n)$ and $W^Q(n)$ are Walsh Code allotted to I-channel and Q-channel, $C_j(n)$ is PN sequence, $T_c$ is the chip width, $f_0$ is the frequency of the carrier, and $h(t)$ is the impulse response of the shaping filter.

Figure 2:
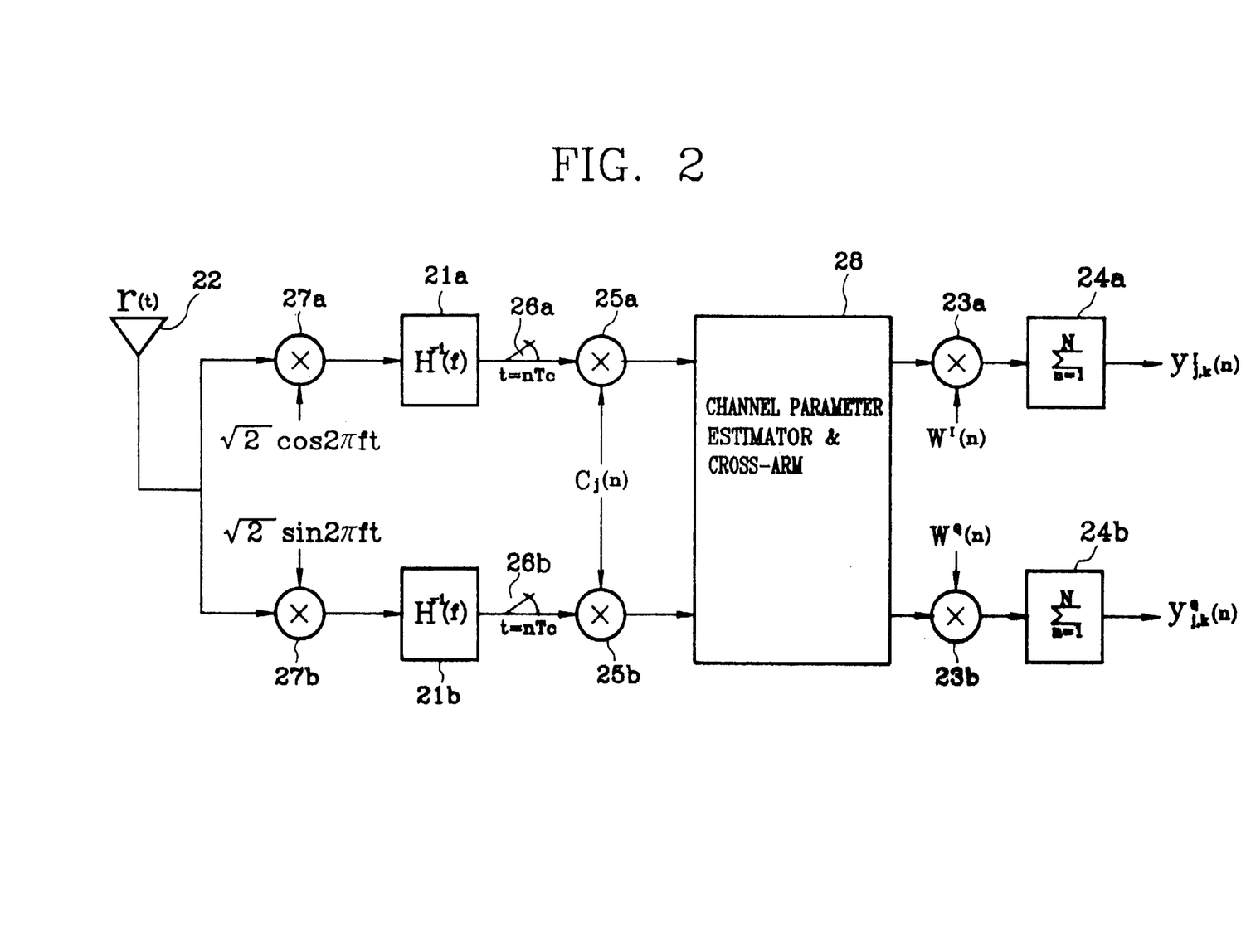
FIG. 2 is a block diagram showing the constitution of the demodulator according to the present invention.

FIG. 2 is a block diagram showing the constitution of an exemplary demodulator according to the present invention.

Referring to FIG. 2, a branch demodulator for a k-th channel path within a rake combiner in the j-th transmitting device of the present invention will be described.

Signals r(t) which have been received through an antenna 22 are those which have passed through a multi-path fading channel. These signals r(t) are made to undergo a frequency demodulation based on the carrier waves by being supplied to multipliers 27a and 27b which are the first and the second amplitude-demodulating means.

The frequency demodulated signals which have passed through the amplitude-demodulating means 27a and 27b are made to pass through matched filters 21a and 21b which are pulse deshaping means for deshaping the pulse waves to the original signals. The output signals of the matched filters 21a and 21b are sampled by sampling means 26a and 26b so as to be outputted as digital signals.

The sampled signals of the I-channel and the Q-channel pass through pseudo-random demodulating means 25a and 25b (consisting of multipliers) so as to be despread based on the PN code. Thereafter, the signals which have been despread based on the PN code are compensated by a channel parameter estimator and cross arm 28. Then, they are Walsh despread by Walsh despreading means 23a and 23b which consist of multipliers for Walsh-despreading based on the different Walsh codes for the I-channel and the Q-channel.

The respective signal of Walsh-despreading means are accumulated during the bit duration, i.e., during the N chip duration. Thus demodulated signals respectively from the I-channel and the Q-channel are outputted.

Figure 3:
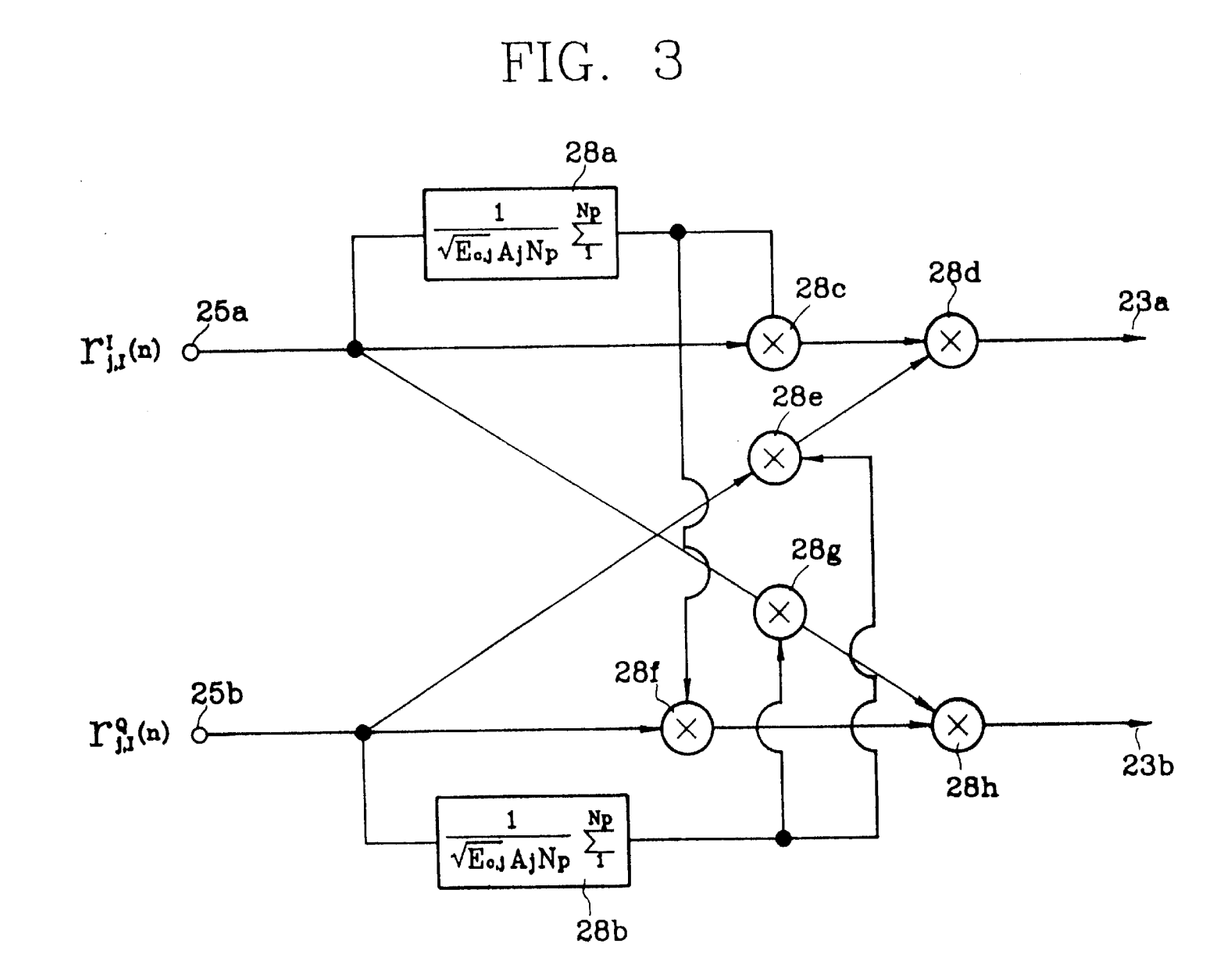
FIG. 3 is a block diagram showing the constitutions of the channel parameter estimator and the cross-arm in FIG. 2.

FIG. 3 is a block diagram showing the constitutions of the exemplary channel parameter estimator and cross-arm in FIG. 2.

Referring to FIG. 3, the channel parameter estimator and cross arm 28 includes: an amplitude and phase estimator 28a for the I-channel; and an amplitude and phase estimator 28b for the Q-channel.

The output signals of an amplitude and phase estimator 28a for said I-channel are multiplied by the output signals of said multiplier 25a at the multiplier 28c, so as to be spread, while the output signals of an amplitude and phase estimator 28b for said Q-channel are multiplied by the output signals of said muliplier 25b at multiplier 28e, so as to be spread. The output signals of multiplier 28e and that of multiplier 28c are multiplied and spread at multiplier 28d, so as to be output as I-channel signals of the cross arm and channel parameter estimator to multiplier 23a.

The output signals of an amplitude and phase estimator 28a for said I-channel are multiplied by the output signals of said multiplier 25b at the multiplier 28f, so as to spread, while the output signals of an amplitude and phase estimator 28b for said Q-channel are multiplied by the output signals of said muliplier 25a at multiplier 28g, so as to be spread. The output signals of multiplier 28g and that of multiplier 28f are multiplied and spread at multiplier 28h, so as to be output as Q-channel signals of the cross channel and channel parameter estimator to multiplier 23b.

In the demodulator, the received signals which have passed through the multi-path fading channel can be expressed as follows.

$$r(t) = \sum_{j=1}^{K_U} r_j(t) + n(t)$$

where $K_U$ is the number of the users receiving services from where $K_U$ is the number of the users receiving services from one base station.

If a perfect synchronization is assumed between the transmitting and receiving ends, the signals can be expressed as follows.

$$r_j(t) = \sqrt{2}\sqrt{(E_{c,j})}\sum_n [A_j + W^I(n)x^I{}_j(n)] \cdot$$

$$\sum_{k=1}^{L} \alpha_{j,k}(n)h(t-nT_c)C_j(n)\cos(2\pi f_0 t + \phi_{j,k}(n)) + \sqrt{2}\sqrt{(E_{c,j})}$$

-continued $$\sum_n W^Q(n)x^Q{}_j(n) \cdot \sum_{k=1}^{L} \alpha_{j,k}(n)h(t-nT_c)C_j(n)\sin(2\pi f_0 t + \phi_{j,k}(n))$$

where $\alpha_{j,k}$ and $\phi_{j,k}(n)$ are the amplitude and phase for the kth path of the j-th user, and L is the number of the channel path.

If it is the following case, $$\int_{-\infty}^{\infty} h^2(t)dt = 1$$

then the signal of the I-channel in front of the cross channel can be expressed as follows:

$$r^I{}_{j,k}(n) = \alpha_{j,k}(n)\sqrt{(E_{c,j})}\{A_j + W^T(n)x^I{}_j(n)\}C_j(n)C_j(n)\cos\phi_{j,k}(n) +$$

$$\alpha_{j,k}(n)\sqrt{(E_{c,j})} + W^Q(n)x^Q{}_j(n)\}C_j(n)C_j(n)\sin\phi_{j,k}(n) + v^I(n)$$

Meanwhile the signal for the Q-channel can be expressed as follows:

$$r^Q{}_{j,k}(n) = \alpha_{j,k}(n)\sqrt{(E_{c,j})} + W^Q(n)x^Q{}_j(n)C_j(n)C_j(n)\cos\phi_{j,k}(n) -$$

$$\alpha_{j,k}(n)\sqrt{(E_{c,j})}\{A_j + W^I(n)x^I{}_j(n)C_j(n)C_j(n)\cos\phi_{j,k}(n) + v^Q(n)$$

where $v^I(n)$ and $v_Q(n)$ respectively are noise components due to the interchip interference at the I-channel and the Q-channel and the thermal noise at the channels.

The amplitude and the phase for the fading channel path can be estimated by averaging the input signals during the $N_p$ chip period as shown below.

$$\hat{\alpha}_{i,j}(n)\cos\hat{\phi}_{i,j}(n) = \frac{1}{N_p A_j\sqrt{E_{c,j}}}\sum_{m=n-N_p+1}^{n} r^I{}_{i,j}(m)$$

$$\hat{\alpha}_{i,j}(n)\sin\hat{\phi}_{i,j}(n) = -\frac{1}{N_p A_j\sqrt{E_{c,j}}}\sum_{m=n-N_p+1}^{n} r^Q{}_{i,j}(m)$$

where $N_P$ is a multiple of N, and its value should be as large as possible within the range that $\alpha_{j,k}(n)$ and $\phi_{j,k}(n)$ are not varied.

In the modulator of FIG. 1 and in the modulator of FIG. 2, if it is assumed that the PN codes for the I-channel and the Q-channel are different from each other, and that the PN code for the I-channel is $C^I{}_j(N)$, and that the PN code for the Q-channel is $C^Q{}_j(N)$, then the following equations can be established.

$$\hat{\alpha}_{i,j}(n)\cos\hat{\phi}_{i,j}(n) =$$

$$\frac{1}{N_p}\sum_{m=n-N_p+1}^{n}\{\alpha_{i,j}(m)\cos\phi_{i,j}(m) + \alpha_{i,j}(m)\sin\phi_{i,j}(m)C_j{}^Q(m)C_j{}^I(m)\}$$

$$\hat{\alpha}_{i,j}(n)\sin\hat{\phi}_{i,j}(n) =$$

$$\frac{1}{N_p}\sum_{m=n-N_p+1}^{n}\{\alpha_{i,j}(m)\sin\phi_{i,j}(m) - \alpha_{i,j}(m)\cos\phi_{i,j}(m)C_j{}^Q(m)C_j{}^I(m)\}$$

In the above two equations, the second terms within the parenthesis contribute to the estimation values as errors. In the present invention, the estimation errors are reduced by using one PN code [that is, $C^I_j(n)=C^Q_j(n)=C_j(n)$] as shown below.

$$\hat{\alpha}_{i,j}(n)\cos\hat{\phi}_{i,j}(n) = \frac{1}{N_p} \sum_{m=n-N_p+1}^{n} \alpha_{i,j}(m)\cos\phi_{i,j}(m)$$

$$\hat{\alpha}_{i,j}(n)\sin\hat{\phi}_{i,j}(n) = \frac{1}{N_p} \sum_{m=n-N_p+1}^{n} \alpha_{i,j}(m)\sin\phi_{i,j}(m)$$

When the signals of the I-channel are added for one bit (N chip) after multiplying them by a Walsh code $W^I(n)$ at the rear end of the cross arm, the signals become as follows.

$$y_{j,k}^I(n) =$$

$$\sum_{1}^{N} \{\hat{\alpha}_{j,k}(n)r_{j,k}^I(n)W^I(n)\cos\hat{\phi}_{j,k}(n) - \hat{\alpha}_{j,k}(n)r_{j,k}^Q(n)W^I\sin\hat{\phi}_{j,k}(n)\} =$$

$$N\alpha_{j,k}(n)\hat{\alpha}_{j,k}(n)\sqrt{(E_{c,j})} \{x_j^I(n)\cos\phi_{j,k}(n)\cos\hat{\phi}_{j,k}(n) +$$

$$x_j^I(n)\sin\phi_{j,k}(n)\sin\hat{\phi}_{j,k}(n)\} + v_N^I = N\alpha_{j,k}(n)\hat{\alpha}_{j,k}(n)\sqrt{(E_{c,j})}$$

$$\{x_j^I(n)\cos\phi_{j,k}(n)\cos\hat{\phi}_{j,k}(n) + x_j^I(n)\sin\phi_{j,k}(n)\sin\hat{\phi}_{j,k}(n)\} + v_N^I$$

Similarly, when the signals of the I-channel are added for one bit (N chip) after multiplying them by a Walsh code $W^Q(n)$ at the rear end of the cross arm, the signals become as follows.

$$y_{j,k}^Q(n) = \sum_{1}^{N} \{\hat{\alpha}_{j,k}(n)r_{j,k}^Q(n)W^Q(n)\cos\hat{\phi}_{j,k}(n) + \hat{\alpha}_{j,k}(n)r_{j,k}^I(n)W^Q\sin\hat{\phi}_{j,k}(n)\} =$$

$$N\alpha_{j,k}(n)\hat{\alpha}_{j,k}(n)\sqrt{(E_{c,j})} \{x_j^Q(n)\cos\phi_{j,k}(n)\cos\hat{\phi}_{j,k}(n) + x_j^Q(n)\sin\phi_{j,k}(n)\sin\hat{\phi}_{j,k}(n)\} + v_N^Q =$$

$$N\alpha_{j,k}(n)\hat{\alpha}_{j,k}(n)\sqrt{(E_{c,j})} \{x_j^Q(n)\cos(\phi_{j,k}(n) - \hat{\phi}_{j,k}(n))+\} + v_N^Q(n)$$

The signals $y^I_{j,k}(n)$ and $y^Q_{j,k}(n)$ are inputted into a rake combiner.

Figure 4:
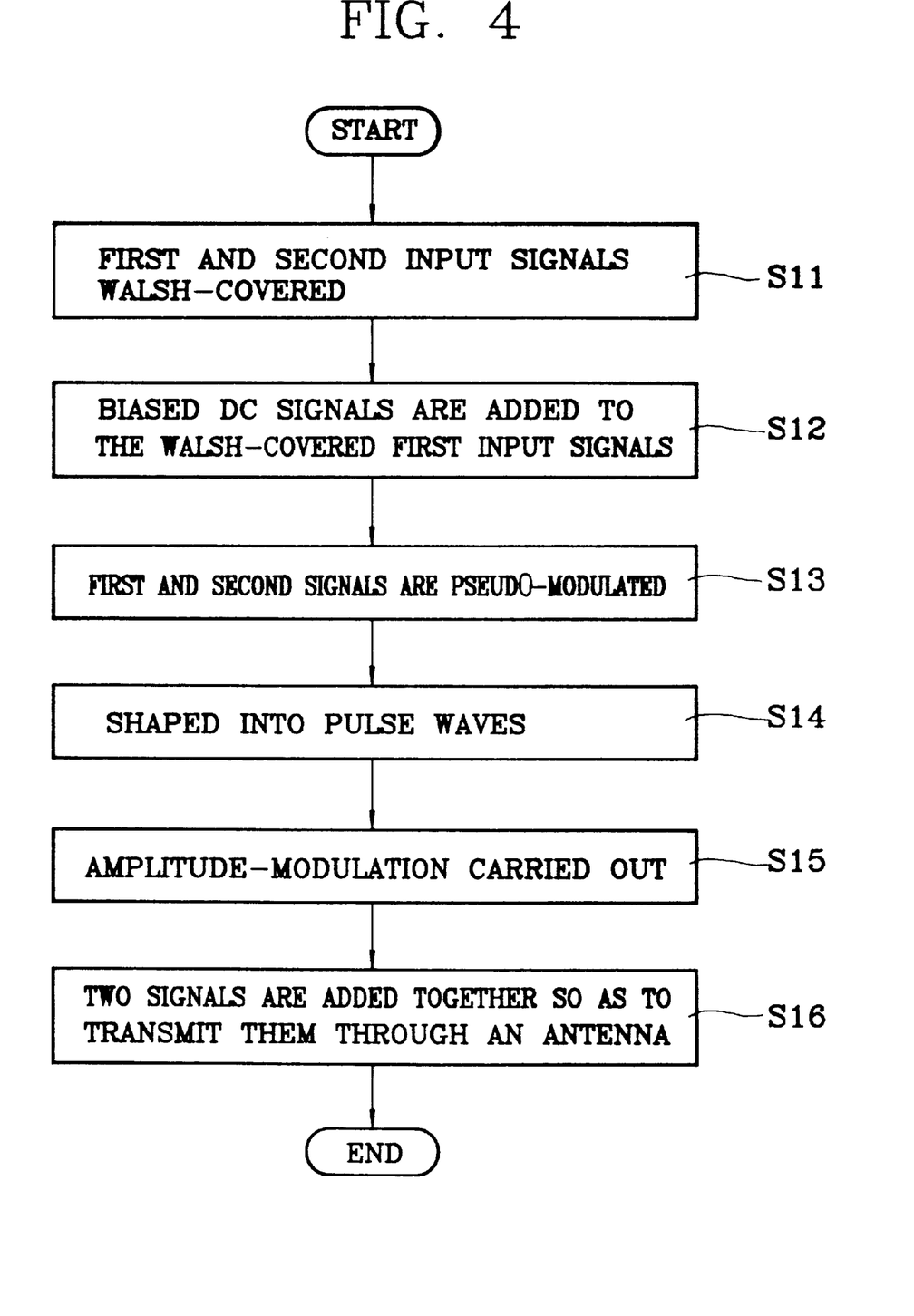
FIG. 4 is a flow chart showing the constitution of the modulating method according to the present invention.

FIG. 4 is a flow chart showing the constitution of an exemplary modulating method according to the present invention.

Referring to FIG. 4, first a step S11 will be described. That is, an I-input signal as a first input signal and a Q-input signal as a second input signal are received. Then based on two different Walsh codes which are in a mutually orthogonal relationship, the I-input signal and the Q-input signal are Walsh-spread, thereby carrying out orthogonal spreading.

At a step S12, the I-input signal which has been orthogonally spread is combined with a pilot signal.

At a step S13, the signal of the I-channel obtained at the step S12 and the orthogonally spread Q-input signal are respectively pseudo-random modulated based on the PN code.

At a step S14, the I-channel signal and the Q-channel signal which have been spread at the step S13 are shaped into pulses respectively, thereby forming an I-channel pulse signal and a Q-channel pulse signal.

Thereafter at a step S15, the I-channel pulse signal and the Q-channel pulse signal which have been obtained at the step S14 are amplitude-modulated, the I-channel pulse signal with cosine and the Q-channel pulse signal.

Finally, at a step S16, the I-channel signal and the Q-channel signal which have been amplitude-modulated at the step S15 are added together so as to be outputted to an antenna.

Figure 5:
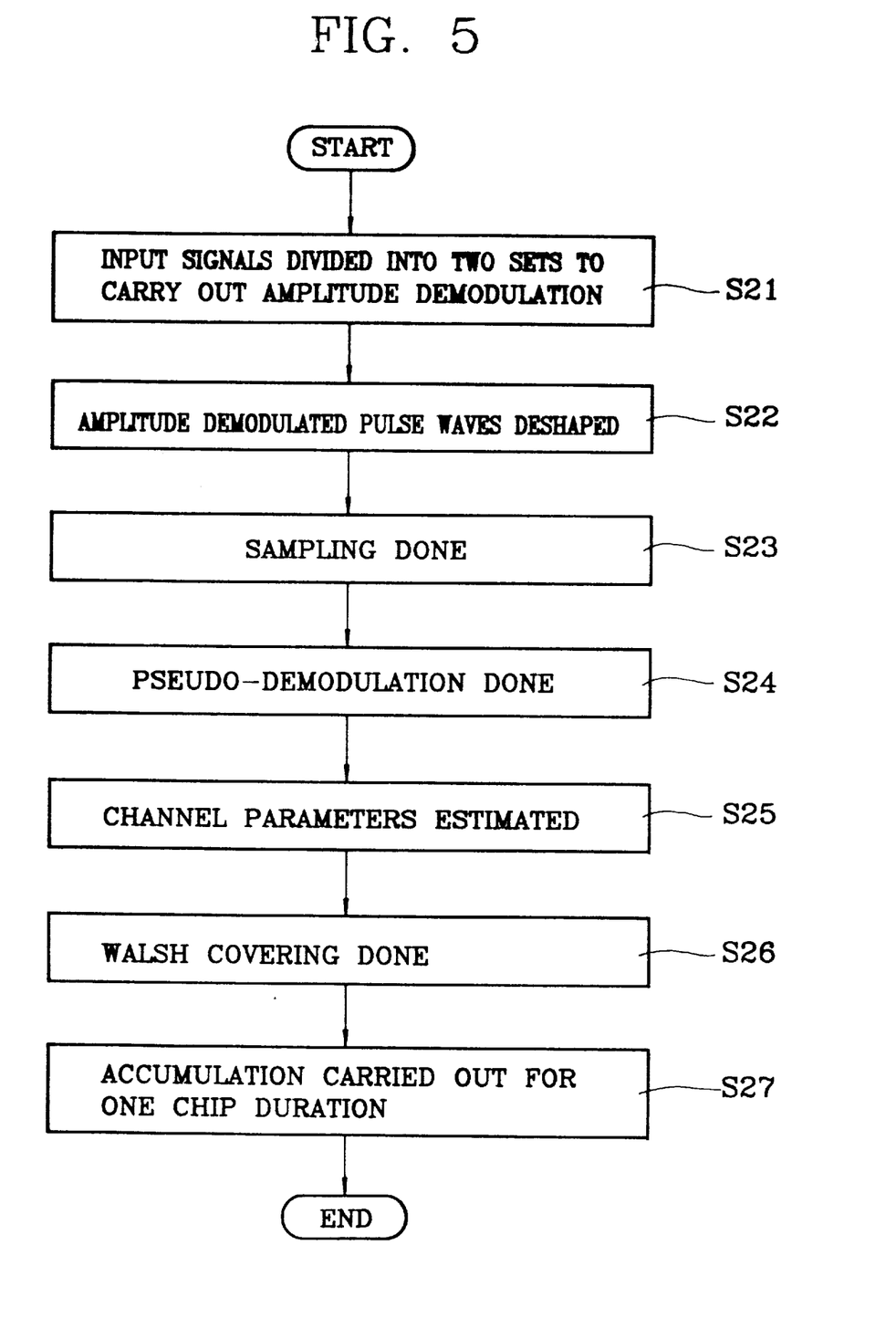
FIG. 5 is a flow chart showing the constitution of the demodulating method according to the present invention.

FIG. 5 is a flow chart showing the constitution of an exemplary demodulating method according to the present invention.

Referring to FIG. 5, first a step S21 will be described. That is, input signals which have been received through the antenna are divided into two sets of signals. Then an I-channel input signal is amplitude-demodulated with cosine signal used in the modulation, while a Q-channel input signal is amplitude-demodulated with sine signal used in the modulation.

Then at a step S22, the Pulse wave (which is the I-arm input signal) and the pulse wave (which is the Q-arm input signal), which have been amplitude-modulated at the step S21, are deshaped into the original signals.

Then at a step S23, a sampling is carried out respectively on the I-channel signal and the Q-channel signal which have been deshaped at the step S22, so as to form digital signals.

Then at a step S24, the I-channel signal and the Q-channel signal which have been obtained at the step S23 are despread based on the PN code which is same as that used in the modulation.

Then at a step S25, the I-channel signal and the Q-channel signal which have been obtained at the step S24 are manipulated so that the channel parameter can be estimated, thereby forming an I-channel output signal and a Q-channel output signal.

Then at a step S26, the I-channel output signal and the Q-channel output signal which have been obtained at the step S25 are Walsh-despread based on the Walsh codes which are in a mutually orthogonal relationship like in the modulation, thereby carrying out an orthogonal inverse spreading.

Finally, at a step S27, the signals which have been obtained at the step S26 are accumulated for one chip duration, and are outputted.

According to the present invention as described above, different orthogonal Walsh codes which are in a mutually rectangularly crossing relationship are used to make the I-channel and the Q-channel mutually orthogonal, thereby eliminating the crosstalk interference. Further, pseudo-random modulation/demodulation are carried out by using one single PN code, and therefore, errors in estimation of the channel parameters are minimized. Consequently, receiving performance can be significantly improved, with the result that the communication quality for CDMA system can be improved.

What is claimed is:

1. A coherent dual-channel QPSK modulator for a CDMA system, receiving two input signals through two input terminals, said modulator comprising:

a first Walsh-spreading means for receiving first input signals through a first input terminal to carry out a Walsh-spreading;

a second Walsh-spreading means for receiving second input signals through a second input terminal to carry out a Walsh-spreading;

a first adder means for adding a pilot signal to output signals of said first Walsh-spreading means;

a first pseudo-modulating means for pseudo-random modulating an output of said adder means based on a certain PN code;

a second pseudo-modulating means for pseudo-random modulating an output of said second Walsh-spreading means based on a certain PN code;

a first pulse shaping means for shaping output signals of said first pseudo-random modulating means into pulse waves to output pulse waves;

a second pulse shaping means for shaping output signals of said second pseudo-random modulating means into pulse waves to output pulse waves;

a first amplitude modulating means for amplitude-modulating output signals of said first pulse shaping means;

a second amplitude modulating means for amplitude-modulating output signals of said second pulse shaping means; and a second adder means for adding output signals of said first amplitude modulating means and output signals of said second amplitude modulating means.

2. A coherent dual-channel QPSK modulator as in claim 1, wherein:
the Walsh code used for Walsh spreading at said first Walsh-spreading means is orthogonal to the Walsh code used for Walsh-spreading at said second Walsh-spreading means.

3. A coherent dual-channel QPSK modulator as in claim 1, wherein:
the PN code used in said first pseudo-random modulating means is same as the PN code used in said second pseudo-random modulating means.

4. A coherent dual-channel QPSK modulator as in claim 1, wherein:
the frequency response of said first pulse shaping means is same as that of said second pulse shaping means.

5. A coherent dual-channel QPSK modulator as in claim 1, wherein:
the modulation signals used in said first amplitude-modulating means are orthogonal to the modulation signals used in said second amplitude-modulating means.

6. A coherent dual-channel QPSK demodulator for a CDMA system receiving two input signals through an antenna, said demodulator comprising:
a first amplitude demodulating means for receiving input signals through an antenna to amplitude-demodulate the input signals into demodulated signals;

a second amplitude demodulating means for receiving input signals through an antenna to amplitude-demodulate the input signals into demodulated signals;

a first pulse deshaping means for deshaping the output pulses of said first amplitude demodulating means to the original signal form;

a second pulse deshaping means for deshaping output pulses of said second amplitude demodulating means to the original signal form;

a first sampling means for sampling output signals of said first pulse deshaping means to output them in the form of digital signals;

a second sampling means for sampling output signals of said second pulse deshaping means to output them in said form of digital signals;

a first pseudo-random demodulating means for pseudo-random demodulating output signals of said first sampling means based on pseudo noise (PN);

a second pseudo-random demodulating means for pseudo-random demodulating output signals of said second sampling means based on pseudo noise (PN);

a channel parameter estimating means for receiving output signals of said first pseudo-random demodulating means and output signals of said second pseudo-random demodulating means to estimate channel parameters so as to output first output signals and second output signals;

a first Walsh-despreading means for receiving first output signals from said cross-arm means to carry out a Walsh-despreading;

a second Walsh-despreading means for receiving second output signals from said cross-arm means to carry out a Walsh-despreading;

a first accumulating means for receiving output signals of said first Walsh-despreading means to carry out accumulation for the chip duration; and a second accumulating means for receiving output signals of said second Walsh-despreading means to carry out accumulations for the chip duration.

7. A coherent dual-channel QPSK demodulator as in claim 6, wherein:
the demodulating signals used in said first amplitude demodulating means are orthogonal to the demodulating signals used in said second amplitude demodulating means.

8. A coherent dual-channel QPSK demodulator as in claim 6, wherein:
the demodulating signals used in said first amplitude demodulating means are same as the modulating signals used in said first amplitude modulating means of the coherent dual-channel QPSK modulator corresponding to the coherent dual-channel QPSK demodulator; and the demodulating signals used in said second amplitude demodulating means are same as the modulating signals used in said second amplitude modulating means of the coherent dual-channel QPSK modulator corresponding to the coherent dual-channel QPSK demodulator.

9. A coherent dual-channel QPSK demodulator as in claim 6, wherein:
the frequency response of said first pulse deshaping means is same as the frequency response of said second pulse deshaping means.

10. A coherent dual-channel QPSK demodulator as in claim 6, wherein:
the PN code used in said first pseudo-random demodulating means is same as the PN code used in said second pseudo-demodulating means.

11. A coherent dual-channel QPSK demodulator as in claim 6, wherein:
the PN code used in said firs pseudo-random demodulating means is same as the PN code used in said first pseudo-modulating means of the coherent dual-channel QPSK modulator corresponding to the coherent dual-channel QPSK demodulator; and the PN code used in said second pseudo-random demodulating means is same as the PN code used in said second pseudo-random modulating means of the coherent dual-channel QPSK modulator corresponding to the coherent dual-channel QPSK demodulator.

12. A coherent dual-channel QPSK demodulator as in claim 6, wherein:
the Walsh code used in Walsh-despreading by said first Walsh despreading means is orthogonal to the Walsh code used in Walsh-despreading by said second Walsh-despreading means.

13. A coherent dual-channel QPSK demodulator as in claim 6, wherein:
the Walsh code used in Walsh-despreading by said first Walsh-despreading means is same as the Walsh code used in Walsh-spreading by a first Walsh-spreading means of a coherent dual-channel QPSK modulator corresponding to the coherent dual-channel QPSK demodulator; and
the Walsh code used in Walsh-despreadinp by said second Walsh-despreading means is same as the Walsh code used in Walsh-spreading by a second Walsh-spreading means of the coherent dual-channel QPSK modulator corresponding to the coherent dual-channel QPSK demodulator.

14. A coherent dual-channel QPSK modulating method for a CDMA system receiving two input signals through two input terminals, said method comprising the steps of:
i receiving first and second input signals to Walsh-spread them based on different Walsh codes;
ii adding pilot signals to the Walsh-spread first input signals so as to form first signals;
iii pseudo-random modulating the first signals of step ii and the Walsh-spread input signals of step i based on a certain PN, so as to form pseudo-random modulated first signals and second signals;
iv shaping the pseudo-random modulated first and second signals of step iii into pulse waves so as to form first pulse signals and second pulse signals;
v amplitude-modulating the first and second pulse signals of step iv into different modulated signals; and
vi adding the amplitude-modulated first and second signals of step v so as to output them to an antenna.

15. A coherent dual-channel QPSK modulating method as in claim 14, wherein:
the Walsh code used for Walsh-spreading the first input signal at step i is orthogonal to the Walsh code used for Walsh-spreading the second input signals.

16. A coherent dual-channel QPSK modulating method as in claim 14, wherein:
the PN code used for pseudo-modulating the first signals at step iii is same as the PN code used for pseudo-random modulating the second signals.

17. A coherent dual-channel QPSK modulating method as in claim 14, wherein:
at step iv, the first and second signals are shaped into pulse waves having the same frequency response characteristics.

18. A coherent dual-channel QPSK modulating method as in claim 14, wherein:
at step v, the modulation signals used for the first pulse signals is orthogonal to the modulation signals used for the second pulse signals.

19. A coherent dual-channel QPSK demodulating method for a CDMA system receiving two input signals through two input terminals, said method comprising the steps of:
i dividing the input signals from an antenna into the first and second input signals so as to amplitude-demodulate them;

ii deshaping the amplitude-demodulated first and second input pulse waves of step into original signals so as to form first and second signals;
iii sampling the deshaped first and second signals of step ii into digital signals;
iv pseudo-random demodulating the first and second signals of step iii based on a certain PN;
v manipulating the first and second signals of step iv to estimate the channel parameters so as to form first output signals and second output signals;
vi Walsh-despreading the first output signals and the second output signals of step v based on the Walsh code; and
vii accumulating the Walsh-despread signals of step vi for a chip duration before outputting them.

20. A coherent dual-channel QPSK demodulating method as in claim 19, wherein:
at step i, the demodulating signal used for amplitude-demodulating the first input signal is orthogonal to the demodulating signal used for amplitude-demodulating the second input signals.

21. A coherent dual-channel QPSK demodulating method as in claim 19, wherein:
at step i, the demodulating signal used for amplitude-demodulating the first input signal is same as the modulating signal used for amplitude-modulating the first input signal in a coherent dual-channel QPSK modulating method corresponding to the coherent dual-channel QPSK demodulating method.

22. A coherent dual-channel QPSK demodulating method as in claim 19, wherein:
at step ii, in order to obtain the same frequency response characteristics, the pulse wave of the first input signal and the pulse wave of the second input signal are deshaped to replicate the original signals.

23. A coherent dual-channel QPSK demodulating method as in claim 19, wherein:
at step iv, the PN code used in pseudo-random demodulating the first signal is same as the PN code used in pseudo-random demodulating the second signal.

24. A coherent dual-channel QPSK demodulating method as in claim 19, wherein:
at step iv, the pN code used in pseudo-random demodulating the first signal is same as the PN code used in pseudo-random modulating the Walsh-spread first signal in a coherent dual-channel QPSK modulating method corresponding to the coherent dual-channel QPSK demodulating method; and
the PN code used in pseudo-random demodulating the second signal is same as the PN code used in pseudo-random modulating the Walsh-spread second signal in the coherent dual-channel QPSK modulating method corresponding to the coherent dual-channel QPSK demodulating method.

25. A coherent dual-channel QPSK demodulating method as in claim 19, wherein:
at step vi, the Walsh code used for Walsh-despreading the first output signal is orthogonal to the Walsh code used for Walsh-despreading the second output signals.

26. A coherent dual-channel QPSK demodulating method as in claim 19, wherein:
at step vi, the Walsh code used for Walsh-despreading the first output signal is same as the Walsh code used for Walsh-spreading the first input signal in a coherent dual-channel QPSK modulating method corresponding to the coherent dual-channel QPSK demodulating method; and the Walsh code used for Walsh-despreading the second output signal is same as the Walsh code used for Walsh-spreading the second input signal in the coherent dual-channel QPSK modulating method corresponding to the coherent dual-channel QPSK demodulating method.

* * * * *

(12) EX PARTE REEXAMINATION CERTIFICATE (7801st)
United States Patent
Kim et al.

(10) Number: US 5,960,029 C1
(45) Certificate Issued: Oct. 12, 2010

(54) COHERENT DUAL-CHANNEL QPSK MODULATOR/DEMODULATOR FOR CDMA SYSTEMS, AND MODULATING/DEMODULATING METHODS THEREFOR

(75) Inventors: Seong-Rag Kim, Daejeon (KR); Hun Lee, Daejeon (KR); Byung-Shik Kang, Daejeon (KR); Jae-Wook Jung, Daejeon (KR)

(73) Assignee: Electronics and Telecommunications Research Institute, Gajung-Dong, Daejeon (KR)

Reexamination Request:
No. 90/010,454, Mar. 16, 2009

Reexamination Certificate for:
Patent No.: 5,960,029
Issued: Sep. 28, 1999
Appl. No.: 08/723,397
Filed: Sep. 30, 1996

(30) Foreign Application Priority Data

Dec. 6, 1995 (KR) .............................. 9547060

(51) Int. Cl.
*H04B 1/00* (2006.01)
*H04B 7/216* (2006.01)
*H04B 3/10* (2006.01)
*H04B 1/38* (2006.01)
*H04J 11/00* (2006.01)
*H04K 1/10* (2006.01)

(52) U.S. Cl. .................. 375/140; 370/209; 370/335; 370/342; 370/491; 370/150; 375/150; 375/219; 375/260

(58) Field of Classification Search .................. None
See application file for complete search history.

(56) References Cited

U.S. PATENT DOCUMENTS

| | | | |
|---|---|---|---|
| 4,901,307 A | 2/1990 | Gilhousen | |
| 5,103,459 A | 4/1992 | Gilhousen et al. | |
| 5,235,614 A | 8/1993 | Bruckert et al. | |
| 5,309,474 A | 5/1994 | Gilhousen | |
| 5,327,455 A | 7/1994 | De Gaudenzi et al. | |
| 5,406,629 A | 4/1995 | Harrison et al. | |
| 5,414,728 A | 5/1995 | Zehavi | |
| 5,416,797 A | 5/1995 | Gilhousen et al. | |
| 5,418,813 A | 5/1995 | Schaffner et al. | |
| 5,515,396 A | 5/1996 | Dalekotzin | |
| 5,577,025 A | 11/1996 | Skinner et al. | |
| 5,602,833 A | 2/1997 | Zehavi | |
| 5,619,524 A | 4/1997 | Ling et al. | |
| 5,691,974 A | 11/1997 | Zehavi et al. | |
| 5,712,869 A | 1/1998 | Lee et al. | |
| 5,734,647 A | 3/1998 | Yoshida et al. | |
| 5,751,761 A | 5/1998 | Gilhousen | |
| 5,940,434 A | 8/1999 | Lee et al. | |
| 5,960,029 A | 9/1999 | Kim et al. | |
| 6,108,369 A | 8/2000 | Ovesjo et al. | |
| 6,219,374 B1 | 4/2001 | Kim et al. | |
| 6,246,697 B1 | 6/2001 | Whinnett et al. | |

FOREIGN PATENT DOCUMENTS

KR 0155510 1/1998

OTHER PUBLICATIONS

PN–3421 (to be published as IS–95–A), Ballot Version, "TR 45, Mobile Station–Base Station Compatibility Standard for Dual–Mode Wideband Spread Spectrum Cellular System".

(Continued)

*Primary Examiner*—Colin M Larose (57) ABSTRACT

A coherent dual-channel QPSK modulator/demodulator for a CDMA system, and modulating/demodulating methods therefor, are disclosed, in which the crosstalk interferences between an I-channel and a Q-channel are eliminated by an orthogonal spreading method, which assigns different Walsh codes to the I-channel and Q-channel. Pseudo-random modulation and pseudo-random demodulation are carried out by using one PN code so as to minimize the channel parameter estimation errors, thereby improving receiving performance.

OTHER PUBLICATIONS

Jari Iinatti, et al., "Performance of DS Signal Data Detection Based on the Matched Filter and the Median Filter in the AWGN Channel and With Continuous Tone–Jamming," PIMRC '94 (1994).

Tero Ojanperä, et al. "An Overview of cdma, WCDMA, and EDGE," The Mobile Communications Handbook, ($2^{nd}$ Edition, 1999).

"A Coherent Dual Channel QPSK Modulation for the Reverse Link in a CDMA System," Korea Information & Communications Society, Autumnal Scientific Seminar, pp. 15–18.

The CDMA Engineering Handbook, vol. 1: Concepts in CDMA, Mar. 1, 1993.

TIA/EIA PN–3421 Ballot Version, "Mobile Station—Base Station Compatibility Standard for Dual–Mode Wideband Spread Spectrum Cellular System".

Kalet "The Radio Interface", CDMA IS 1995, Qualcomm.

Ling "Analysis Of Performance And Capacity of Coherent DS–CDMA Reverse Link Communications", Proc VTC '95, pp. 912–916 (1995).

Lin "Performance of Multi–Code CDMA Wireless Personal Communications Networks," IEEE VTC '95, pp. 1060–64 (Jun. 1995).

Zehavi, et al. "The PCS CDMA System Overview," Record of the Third Annual Int'l Conference on Universal Personal Communications, Sep. 27–Oct. 1, 1994, pp. 612–618.

TIA/EIA PN–3421 Ballot Version, "Mobile Station—Base Station Compatibility Standard for Dual–Mode Wideband Spread Spectrum Cellular System" Dec. 1994, Section 7, pp. 7–1 to 7–27.

Request for Reexamination of U.S. Patent No. RE40,385, Filed March 16, 2009.

Publication No. 1019959954532 Filed Jul. 31, 1997.

"Physical Layer Standard for cdma2000 Spread Spectrum Systems", Release A, 3GPP2 C.S0002–A, Jun. 9, 2000.

"Peak to Peak Average Power Reduction Method for 3G Reverse Link", submitted to the Telecommunications Industry Association TR45.5 Standards Committee Jan. 26, 1998.

Figure 1 of US RE40385, Published Jun. 17, 2008.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 and 14-18 is confirmed.

New claims 27-88 are added and determined to be patentable.

Claims 6-13 and 19-26 were not reexamined.

27. *A coherent dual-channel QPSK modulator as in claim 1, 2, 3, 4, or 5, wherein:*
 *one of the first and second input terminals is coupled to an I-channel and the other of the first and second input terminals is coupled to a Q-channel.*

28. *A coherent dual-channel QPSK modulator as in claim 1, 2, 3, 4, or 5, wherein:*
 *the output of the first adder means is applied to an I-channel,*
 *the output of the second Walsh-spreading means is applied to a Q-channel,*
 *the first pseudo-modulating means has a first pseudo-modulating means input terminal coupled to the I-channel, and*
 *the second pseudo-modulating means has a second pseudo-modulating means input terminal coupled to the Q-channel.*

29. *A coherent dual-channel QPSK modulator as in claim 1, wherein:*
 *one of the first and second input terminals is coupled to an I-channel and the other of the first and second input terminals is coupled to a Q-channel,*
 *the Walsh code used for Walsh spreading at said first Walsh-spreading means is orthogonal to the Walsh code used for Walsh-spreading at said second Walsh-spreading means, and*
 *the PN code used in said first pseudo-random modulating means is same as the PN code used in said second pseudo-random modulating means.*

30. *A coherent dual-channel QPSK modulator as in claim 1, wherein:*
 *the output of the first adder means is applied to an I-channel,*
 *the output of the second Walsh-spreading means is applied to a Q-channel,*
 *the first pseudo-modulating means has a first pseudo-modulating means input terminal coupled to the I-channel,*
 *the second pseudo-modulating means has a second pseudo-modulating means input terminal coupled to the Q-channel,*
 *the Walsh code used for Walsh spreading at said Walsh-spreading means is orthogonal to the Walsh code used for Walsh-spreading at said second Walsh-spreading means, and*
 *the PN code used in said first pseudo-random modulating means is same as the PN code used in said second pseudo-random modulating means.*

31. *A coherent dual-channel QPSK modulator as in claim 2, wherein:*
 *the PN code used in said first pseudo-random modulating means is same as the PN code used in said second pseudo-random modulating means.*

32. *A coherent dual-channel QPSK modulator as in claim 2, wherein:*
 *the frequency response of said first pulse shaping means is same as that of said second pulse shaping means.*

33. *A coherent dual-channel QPSK modulator as in claim 2, wherein:*
 *the modulation signals used in said first amplitude-modulating means are orthogonal to the modulation signals used in said second amplitude-modulating means.*

34. *A coherent dual-channel QPSK modulating method as in claim 14, 15, 16, 17, or 18, wherein:*
 *the first signals are applied to an I-channel prior to pseudo-random modulation, and*
 *the Walsh-spread second input signals are applied to a Q-channel prior to pseudo-random modulation.*

35. *A coherent dual-channel QPSK modulating method as in claim 14, 15, 16, 17, or 18, wherein:*
 *the pseudo-random modulating step is performed by a pseudo-random modulator,*
 *the first signals are inputted to the pseudo-random modulator through an I-channel, and*
 *the Walsh-spread second input signals are inputted to the pseudo-random modulator through a Q-channel.*

36. *A coherent dual-channel QPSK modulating method as in claim 14, wherein:*
 *the first signals are applied to an I-channel prior to pseudo-random modulation,*
 *the Walsh-spread second input signals are applied to a Q-channel prior to pseudo-random modulation,*
 *the Walsh code used for Walsh-spreading the first input signal at step i is orthogonal to the Walsh code used for Walsh-spreading the second input signals, and*
 *the PN code used for pseudo-modulating the first signals at step iii is same as the PN code used for pseudo-random modulating the second signals.*

37. *A coherent dual-channel QPSK modulating method as in claim 14, wherein:*
 *the pseudo-random modulating step is performed by a pseudo-random modulator,*
 *the first signals are inputted to the pseudo-random modulator through an I-channel, and*
 *the Walsh-spread second input signals are inputted to the pseudo-random modulator through a Q-channel,*
 *the Walsh code used for Walsh-spreading the first input signal at step i is orthogonal to the Walsh code used for Walsh-spreading the second input signals, and*
 *the PN code used for pseudo-modulating the first signals at step iii is same as the PN code used for pseudo-random modulating the second signals.*

38. *A coherent dual-channel QPSK modulating method as in claim 15, wherein:*
 *the PN code used for pseudo-modulating the first signals at step iii is same as the PN code used for pseudo-random modulating the second signals.*

39. *A coherent dual-channel QPSK modulating method as in claim 15, wherein:* at step iv, the first and second signals are shaped into pulse waves having the same frequency response characteristics.

40. A coherent dual-channel QPSK modulating method as in claim 15, wherein:
at step v, the modulation signals used for the first pulse signals is orthogonal to the modulation signals used for the second pulse signals.

41. A coherent dual-channel QPSK modulator for a CDMA system, receiving two input signals through two input terminals, the modulator comprising:
a first Walsh spreader that receives first input signals through a first input terminal to carry out a Walsh-spreading;
a second Walsh spreader that receives second input signals through a second input terminal to carry out a Walsh-spreading;
a first adder that adds a pilot signal to output signals of the first Walsh spreader;
a first pseudo-random modulator that pseudo-random modulates an output of the first adder based on a certain PN code;
a second pseudo-random modulator that pseudo-random modulates an output of the second Walsh spreader based on a certain PN code;
a first shaping filter that shapes output signals of the first pseudo-random modulator into pulse waves to output pulse waves;
a second shaping filter that shapes output signals of the second pseudo-random modulator into pulse waves to output pulse waves;
a first amplitude modulator that amplitude-modulates output signals of the first shaping filter;
a second amplitude modulator that amplitude-modulates output signals of the second shaping filter; and
a second adder that adds output signals of the first amplitude modulator and output signals of the second amplitude modulator, wherein:
the pilot signal is not added to output signals of the second Walsh spreader prior to pseudo-random modulation.

42. A coherent dual-channel QPSK modulator as in claim 41, wherein:
the Walsh code used for Walsh spreading at the first Walsh spreader is orthogonal to the Walsh code used for Walsh spreading at the second Walsh spreader.

43. A coherent dual-channel QPSK modulator as in claim 42, wherein:
the PN code used in the first pseudo-random modulator is the same as the PN code used in the second pseudo-random modulator.

44. A coherent dual-channel QPSK modulator as in claim 42, wherein:
the frequency response of the first shaping filter is the same as that of the second shaping filter.

45. A coherent dual-channel QPSK modulator as in claim 42, wherein:
the modulation signals used in the first amplitude modulator are orthogonal to the modulation signals used in the second amplitude modulator.

46. A coherent dual-channel QPSK modulator as in claim 41, wherein:
the PN code used in the first pseudo-random modulator is the same as the PN code used in the second pseudo-random modulator.

47. A coherent dual-channel QPSK modulator as in claim 41, wherein:
the frequency response of the first shaping filter is the same as that of the second shaping filter.

48. A coherent dual-channel QPSK modulator as in claim 41, wherein:
the modulation signals used in the first amplitude modulator are orthogonal to the modulation signals used in the second amplitude modulator.

49. A coherent dual-channel QPSK modulator as in claim 41, 42, 46, 47, or 48, wherein:
one of the first and second input terminals is coupled to an I-channel and the other of the first and second input terminals is coupled to a Q-channel.

50. A coherent dual-channel QPSK modulator as in claim 41, 42, 46, 47, or 48, wherein:
the output of the first adder is applied to an I-channel,
the output of the second Walsh spreader is applied to a Q-channel,
the first pseudo-random modulator has a first pseudo-random modulator input terminal coupled to the I-channel, and
the second pseudo-random modulator has a second pseudo-random modulator input terminal coupled to the Q-channel.

51. A coherent dual-channel QPSK modulator as in claim 41, wherein:
one of the first and second input terminals is coupled to an I-channel and the other of the first and second input terminals is coupled to a Q-channel,
the Walsh code used for Walsh spreading at the first Walsh spreader is orthogonal to the Walsh code used for Walsh spreading at the second Walsh spreader, and
the PN code used in the first pseudo-random modulator is the same as the PN code used in the second pseudo-random modulator.

52. A coherent dual-channel QPSK modulator as in claim 41, wherein:
the output of the first adder is applied to an I-channel,
the output of the second Walsh spreader is applied to a Q-channel,
the first pseudo-random modulator has a first pseudo-random modulator input terminal coupled to the I-channel, and
the second pseudo-random modulator has a second pseudo-random modulator input terminal coupled to the Q-channel,
the Walsh code used for Walsh spreading at the first Walsh spreader is orthogonal to the Walsh code used for Walsh spreading at the second Walsh spreader, and
the PN code used in the first pseudo-random modulator is the same as the PN code used in the second pseudo-random modulator.

53. A coherent dual-channel QPSK modulating method for a CDMA system receiving two input signals through two input terminals, the method comprising the steps of:
i) receiving first and second input signals to Walsh-spread them based on different Walsh codes;
ii) adding pilot signals to the Walsh-spread first input signals so as to form first signals;
iii) pseudo-random modulating the first signals of step ii and the Walsh-spread second input signals of step i based on a certain PN, so as to form pseudo-random modulated first signals and second signals;

iv) shaping the pseudo-random modulated first and second signals of step iii into pulse waves so as to form first pulse signals and second pulse signals;

v) amplitude-modulating the first and second pulse signals of step iv into different modulated signals; and vi) adding the amplitude-modulated first and second signals of step v so as to output them to an antenna, wherein:

the pilot signals are not added to the Walsh-spread second input signals prior to pseudo-random modulation.

54. *A coherent dual-channel QPSK modulating method as in claim 53, wherein:* the Walsh code used for Walsh-spreading the first input signal at step i is orthogonal to the Walsh code used for Walsh-spreading the second input signals.

55. *A coherent dual-channel QPSK modulating method as in claim 54, wherein:* the PN code used for pseudo-modulating the first signals at step iii is the same as the PN code used for pseudo-random modulating the second signals.

56. *A coherent dual-channel QPSK modulating method as in claim 54, wherein:* at step iv, the first and second signals are shaped into pulse waves having the same frequency response characteristics.

57. *A coherent dual-channel QPSK modulating method as in claim 54, wherein:* at step v, the modulation signals used for the first pulse signals is orthogonal to the modulation signals used for the second pulse signals.

58. *A coherent dual-channel QPSK modulating method as in claim 53, wherein:* the PN code used for pseudo-modulating the first signals at step iii is the same as the PN code used for pseudo-random modulating the second signals.

59. *A coherent dual-channel QPSK modulating method as in claim 53, wherein:* at step iv, the first and second signals are shaped into pulse waves having the same frequency response characteristics.

60. *A coherent dual-channel QPSK modulating method as in claim 53, wherein:* at step v, the modulation signals used for the first pulse signals is orthogonal to the modulation signals used for the second pulse signals.

61. *A coherent dual-channel QPSK modulating method as in claim 53, 54, 58, 59, or 60, wherein:* the first signals are applied to an I-channel prior to pseudo-random modulation, and the Walsh-spread second input signals are applied to a Q-channel prior to pseudo-random modulation.

62. *A coherent dual-channel QPSK modulating method as in claim 53, 54, 58, 59, or 60, wherein:* the pseudo-random modulating step is performed by a pseudo-random modulator, the first signals are inputted to the pseudo-random modulator through an I-channel, and the Walsh-spread second input signals are inputted to the pseudo-random modulator through a Q-channel.

63. *A coherent dual-channel QPSK modulating method as in claim 53, wherein:* the first signals are applied to an I-channel prior to pseudo-random modulation, the Walsh-spread second input signals are applied to a Q-channel prior to pseudo-random modulation, the Walsh code used for Walsh-spreading the first input signal at step i is orthogonal to the Walsh code used for Walsh-spreading the second input signals, and the PN code used for pseudo-modulating the first signals at step iii is the same as the PN code used for pseudo-random modulating the second signals.

64. *A coherent dual-channel QPSK modulating method as in claim 53, wherein:* the pseudo-random modulating step is performed by a pseudo-random modulator, the first signals are inputted to the pseudo-random modulator through an I-channel, and the Walsh-spread second input signals are inputted to the pseudo-random modulator through a Q-channel, the Walsh code used for Walsh-spreading the first input signal at step i is orthogonal to the Walsh code used for Walsh-spreading the second input signals, and the PN code used for pseudo-modulating the first signals at step iii is the same as the PN code used for pseudo-random modulating the second signals.

65. *A coherent dual-channel QPSK modulator for a CDMA system, receiving two input signals through two input terminals, the modulator comprising:* a first Walsh spreader that receives first input signals through a first input terminal to carry out a Walsh-spreading;

a second Walsh spreader that receives second input signals through a second input terminal to carry out a Walsh-spreading;

a first adder that adds a pilot signal to output signals of the first Walsh spreader;

a first pseudo-random modulator that receives a first channel input and pseudo-random modulates the first channel input based on a certain PN code, the first channel input comprising the output of the first adder;

a second pseudo-random modulator that receives a second channel input and pseudo-random modulates the second channel input based on a certain PN code, the second channel input comprising the output of the second Walsh spreader;

a first shaping filter that shapes output signals of the first pseudo-random modulator into pulse waves to output pulse waves;

a second shaping filter that shapes output signals of the second pseudo-random modulator into pulse waves to output pulse waves;

a first amplitude modulator that amplitude-modulates output signals of the first shaping filter;

a second amplitude modulator that amplitude-modulates output signals of the second shaping filter; and a second adder that adds output signals of the first amplitute modulator and output signals of the second amplitude modulator.

66. *A coherent dual-channel QPSK modulator as in claim 65, wherein:* the Walsh code used for Walsh spreading at the first Walsh spreader is orthogonal to the Walsh code used for Walsh spreading at the second Walsh spreader.

67. *A coherent dual-channel QPSK modulator as in claim 66, wherein:* the PN code used in the first pseudo-random modulator is the same as the PN code used in the second pseudo-random modulator.

68. A coherent dual-channel QPSK modulator as in claim 66, wherein:
the frequency response of the first shaping filter is the same as that of the second shaping filter.

69. A coherent dual-channel QPSK modulator as in claim 66, wherein:
the modulation signals used in the first amplitude modulator are orthogonal to the modulation signals used in the second amplitude modulator.

70. A coherent dual-channel QPSK modulator as in claim 65, wherein:
the PN code used in the first pseudo-random modulator is the same as the PN code used in the second pseudo-random modulator.

71. A coherent dual-channel QPSK modulator as in claim 65, wherein:
the frequency response of the first shaping filter is the same as that of the second shaping filter.

72. A coherent dual-channel QPSK modulator as in claim 65, wherein:
the modulation signals used in the first amplitude modulator are orthogonal to the modulation signals used in the second amplitude modulator.

73. A coherent dual-channel QPSK modulator as in claim 65, 66, 70, 71, or 72, wherein:
one of the first and second input terminals is coupled to an I-channel and the other of the first and second input terminals is coupled to a Q-channel.

74. A coherent dual-channel QPSK modulator as in claim 65, 66, 70, 71, or 72, wherein:
the output of the first adder is applied to an I-channel,
the output of the second Walsh spreader is applied to a Q-channel,
the first pseudo-random modulator has a first pseudo-random modulator input terminal coupled to the I-channel, and
the second pseudo-random modulator has a second pseudo-random modulator input terminal coupled to the Q-channel.

75. A coherent dual-channel QPSK modulator as in claim 65, wherein:
one of the first and second input terminals is coupled to an I-channel and the other of the first and second input terminals is coupled to a Q-channel,
the Walsh code used for Walsh spreading at the first Walsh spreader is orthogonal to the Walsh code used for Walsh spreading at the second Walsh spreader, and
the PN code used in the first pseudo-random modulator is the same as the PN code used in the second pseudo-random modulator.

76. A coherent dual-channel QPSK modulator as in claim 65, wherein:
the output of the first adder is applied to an I-channel,
the output of the second Walsh spreader is applied to a Q-channel,
the first pseudo-random modulator has a first pseudo-random modulator input terminal coupled to the I-channel, and
the second pseudo-random modulator has a second pseudo-random modulator input terminal coupled to the Q-channel,
the Walsh code used for Walsh spreading at the first Walsh spreader is orthogonal to the Walsh code used for Walsh spreading at the second Walsh spreader, and
the PN code used in the first pseudo-random modulator is the same as the PN code used in the second pseudo-random modulator.

77. A coherent dual-channel QPSK modulating method for a CDMA system receiving two input signals through two input terminals, the method comprising the steps of:
i) receiving first and second input signals to Walsh-spread them based on different Walsh codes;
ii) adding pilot signals to the Walsh-spread first input signals so as to form first signals;
iii) receiving a first channel input and pseudo-random modulating the first channel input based on a certain PN so as to form pseudo-random modulated first signals, the first channel input comprising the first signals of step ii;
iv) receiving a second channel input and pseudo-random modulating the second channel input based on a certain PN so as to form pseudo-random modulated second signals, the second channel input comprising the Walsh-spread second input signals of step i;
v) shaping the pseudo-random modulated first and second signals of step iii into pulse waves so as to form first pulse signals and second pulse signals;
vi) amplitude-modulating the first and second pulse signals of step iv into different modulated signals; and
vii) adding the amplitude-modulated first and second signals of step v so as to output them to an antenna.

78. A coherent dual-channel QPSK modulating method as in claim 77, wherein:
the Walsh code used for Walsh-spreading the first input signal at step i is orthogonal to the Walsh code used for Walsh-spreading the second input signals.

79. A coherent dual-channel QPSK modulating method as in claim 78, wherein:
the PN code used for pseudo-modulating the first signals at step iii is the same as the PN code used for pseudo-random modulating the second signals.

80. A coherent dual-channel QPSK modulating method as in claim 78, wherein:
at step iv, the first and second signals are shaped into pulse waves having the same frequency response characteristics.

81. A coherent dual-channel QPSK modulating method as in claim 78, wherein:
at step v, the modulation signals used for the first pulse signals is orthogonal to the modulation signals used for the second pulse signals.

82. A coherent dual-channel QPSK modulating method as in claim 77, wherein:
the PN code used for pseudo-modulating the first signals at step iii is the same as the PN code used for pseudo-random modulating the second signals.

83. A coherent dual-channel QPSK modulating method as in claim 77, wherein:
at step iv, the first and second signals are shaped into pulse waves having the same frequency response characteristics.

84. A coherent dual-channel QPSK modulating method as in claim 77, wherein:
at step v, the modulation signals used for the first pulse signals is orthogonal to the modulation signals used for the second pulse signals.

85. A coherent dual-channel QPSK modulating method as in claim 77, 78, 82, 83, or 84, wherein:
the first signals are applied to an I-channel prior to pseudo-random modulation, and the Walsh-spread second input signals are applied to a Q-channel prior to pseudo-random modulation.

86. A coherent dual-channel QPSK modulating method as in claim 77, 78, 82, 83, or 84, wherein:
the pseudo-random modulating steps are performed by a pseudo-random modulator,
the first signals are inputted to the pseudo-random modulator through an I-channel, and
the Walsh-spread second input signals are inputted to the pseudo-random modulator through a Q-channel.

87. A coherent dual-channel QPSK modulating method as in claim 77, wherein:
the first signals are applied to an I-channel prior to pseudo-random modulation,
the Walsh-spread second input signals are applied to a Q-channel prior to pseudo-random modulation,
the Walsh code used for Walsh-spreading the first input signal at step i is orthogonal to the Walsh code used for Walsh-spreading the second input signals, and
the PN code used for pseudo-modulating the first signals at step iii is the same as the PN code used for pseudo-random modulating the second signals.

88. A coherent dual-channel QPSK modulating method as in claim 77, wherein:
the pseudo-random modulating steps are performed by a pseudo-random modulator,
the first signals are inputted to the pseudo-random modulator through an I-channel, and
the Walsh-spread second input signals are inputted to the pseudo-random modulator through a Q-channel,
the Walsh code used for Walsh-spreading the first input signal at step i is orthogonal to the Walsh code used for Walsh-spreading the second input signals, and
the PN code used for pseudo-modulating the first signals at step iii is the same as the PN code used for pseudo-random modulating the second signals.

\* \* \* \* \*